Feb. 28, 1956 R. W. BRANDT 2,736,189
APPARATUS FOR TESTING TIMERS OR THE LIKE
Filed Oct. 27, 1952 2 Sheets-Sheet 1
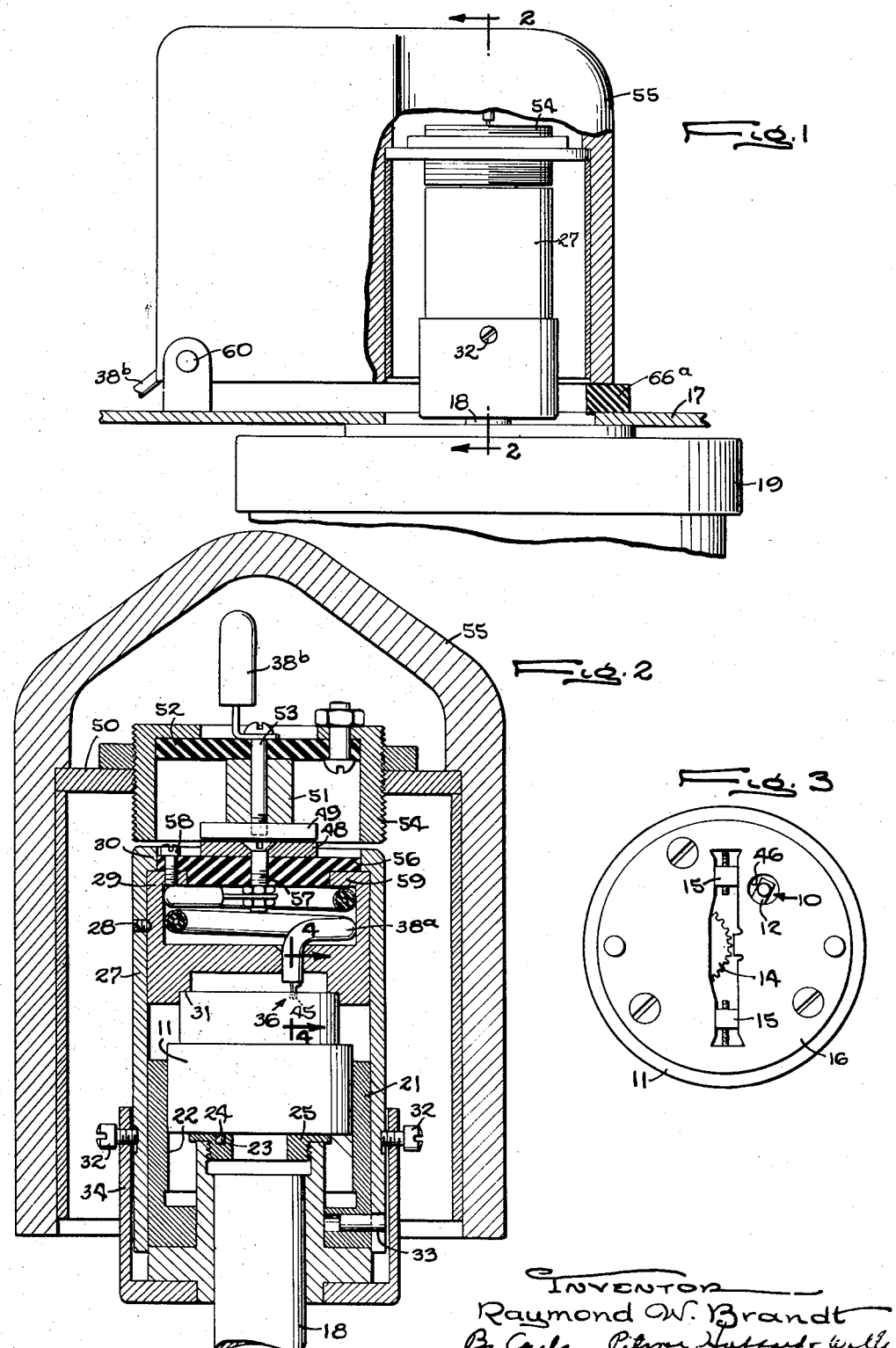

Feb. 28, 1956 R. W. BRANDT 2,736,189
APPARATUS FOR TESTING TIMERS OR THE LIKE
Filed Oct. 27, 1952 2 Sheets-Sheet 2
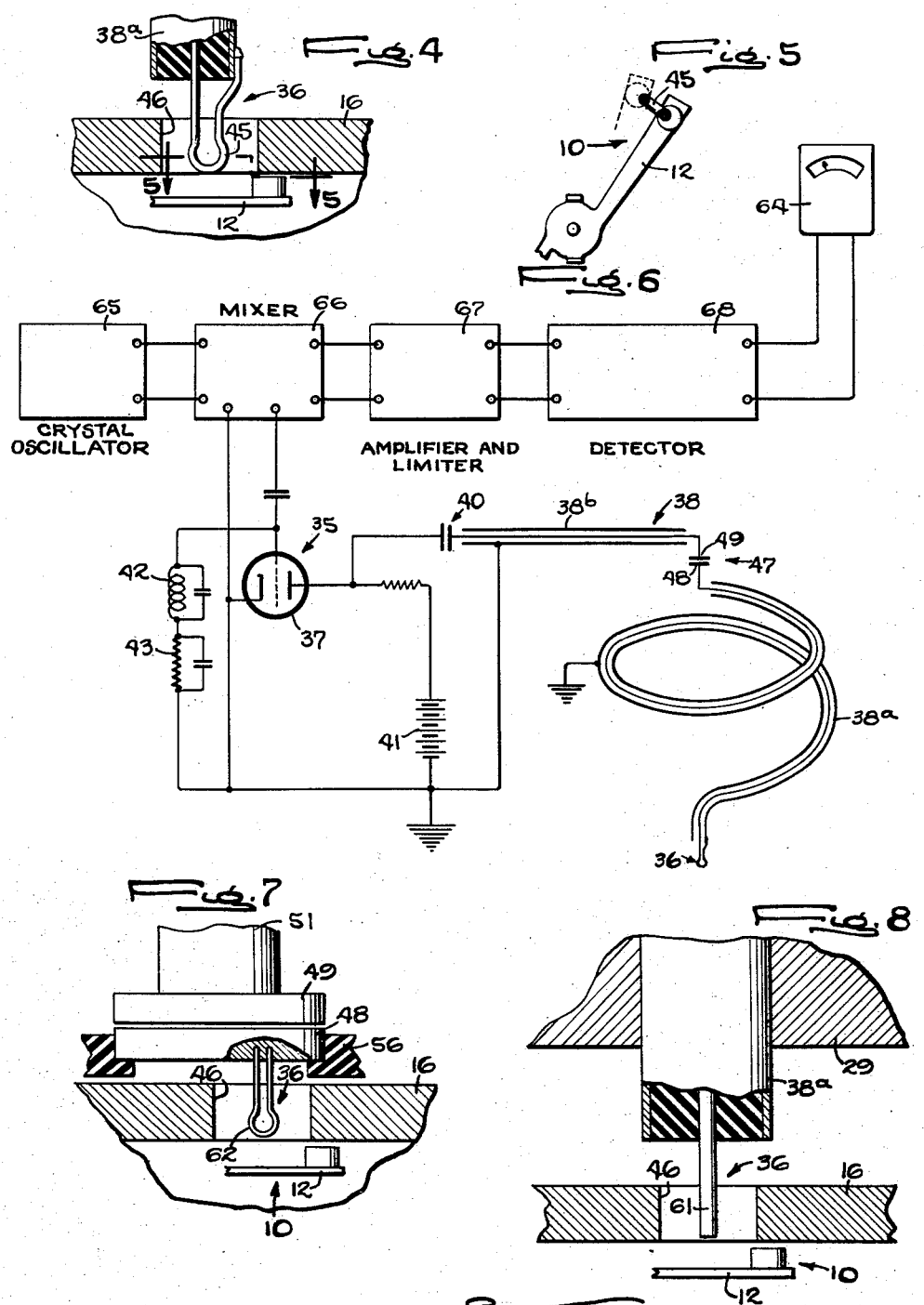
INVENTOR
Raymond W. Brandt
By Carlson, Pitzner, Hubbard & Wolfe
ATTORNEY

United States Patent Office 2,736,189
Patented Feb. 28, 1956

2,736,189

APPARATUS FOR TESTING TIMERS OR THE LIKE

Raymond W. Brandt, Janesville, Wis., assignor to Gibbs Manufacturing and Research Corporation, Janesville, Wis., a corporation of Wisconsin Application October 27, 1952, Serial No. 317,079

13 Claims. (Cl. 73—5)

This invention relates generally to apparatus for measuring the rate of cyclic movement of an oscillating part relative to a carrier while the latter is rotating, one example of such a device being a fuze having a carrier or body and a clock mechanism or timer thereon including a lever which oscillates back and forth at a frequency determined by adjustment of the mechanism. The invention is particularly concerned with apparatus for measuring the frequency of oscillation of the part while its carrier is rotating at high speed.

One object of the present invention is to provide novel apparatus of the above character in which movement of the oscillating part produces an electrical signal of a very high frequency such that the signals may be transferred away from the rotating parts and measured without the distorting effects of noise and stray frequencies generated by the rotating parts.

The foregoing object is achieved by a novel frequency modulation network having a resonant circuit including a pickup element positioned adjacent the path of the oscillating part and cooperating with the latter to form a reactance whose value varies to change the output frequency of the network in response to oscillations of the part.

A more detailed object is to measure the frequency of the oscillating part with a radio frequency oscillator having a tuned circuit including a resonant coaxial line which terminates in a pickup element adjacent the path of the oscillating part and cooperating with the latter to produce a frequency modulated output.

The invention also resides in the provision of a novel electrical coupling in an apparatus of the above character for transmitting the very high frequency electrical signals to be measured away from the rotating parts to nonrotating parts and in the location of the coupling along the resonant coaxial line from the pickup element to avoid distortion of the signals.

Other objects and advantages of the invention will become apparent from the following detailed description taken in connection with the accompanying drawings, in which Figure 1 is a fragmentary side elevation of a preferred form of an apparatus embodying the novel features of the present invention, part of the casing being broken away and shown in section.

Fig. 2 is a fragmentary sectional view taken along the line 2—2 of Fig. 1.

Fig. 3 is a top view of a device under test.

Fig. 4 is a fragmentary sectional view taken along the line 4—4 of Fig. 2.

Fig. 5 is an enlarged fragmentary sectional view taken along the line 5—5 of Fig. 4.

Fig. 6 is a schematic view of the electrical circuit.

Fig. 7 is a fragmentary sectional view similar to Fig. 2 showing a modified form of the invention.

Fig. 8 is a view similar to Fig. 2 showing another modification.

In the drawings, the invention is shown for purposes of illustration embodied in apparatus especially adapted for measuring the frequency of oscillation of a pallet lever 10 which is swung back and forth by a clock mechanism or timer disposed within a generally cylindrical carrier or fuze body 11 of well known construction. The pallet lever is made of steel or other conducting material and includes an arm 12 pivoted near one end wall 16 of the fuze body for swinging between the positions shown respectively in full and in dotted lines in Fig. 5. The frequency of oscillation is determined by an escapement mechanism similar in principle to that of a conventional clock, this mechanism being set in motion automatically when the fuze body is rotating at a predetermined high speed. The effective length of a balance spring, and hence the frequency of oscillation of the pallet lever, is varied by changing the positions of anchors 15 (Fig. 3). Since the fuze is intended for use in a projectile rotating at high speed, it is desirable to test the timer thereon under the same condition of high speed rotation.

While the fuze is being tested, the fuze body 11 is supported by and clamped in a chuck disposed above a table 17 and extending from the upper end of a vertically disposed shaft 18 (Figs. 1 and 2). The shaft is driven by a motor 19 secured to the underside of the table. The chuck includes a lower tubular member 21 having a top recess 22 adapted to receive one end portion of the fuze body so that the latter is located accurately with its axis coinciding with the axis of the shaft. For the purpose of properly orienting the fuze body, a lug 23 (Fig. 2) depending from the fuze body projects into a notch 24 formed in a stop 25. The stop 25 is secured to the lower tubular member 21 and projects into the recess 22. The range of movement or angular displacement of the pallet lever 10 is in this manner located in a definite angular position relative to the chuck.

The upper portion of the chuck includes an inverted cup-like member 27 and a supporting member 29. The latter is disposed within the cup-like member with its upper end abutting against a radially inwardly extending flange 30 thereof and is held in place by a set screw 28. The lower end of the member 29 is recessed as indicated at 31 to telescope closely over and abut against the upper end of the fuze body. Angularly spaced bayonet connections 33 between the inverted cup-like member 27 and the lower cylinder 21 are utilized to secure the cup-like member in position, thereby clamping the fuze carrier firmly between the recess 31 and the stop 25. The inverted cup-like member 27 is held in its clamped position by screws 32 threaded into another tubular member 34 secured on the shaft 18 and in turn engaging the wall of the inverted cup-like member as shown in Figs. 1 and 2.

In accordance with the present invention, a high frequency electrical field is created in the vicinity of the pallet lever 10 during rotation of the fuze body or carrier 11 to produce electrical signals which are responsive to movements of the lever and which may be transferred substantially without distortion to a nonrotatable part where they are measured to indicate the frequency of the lever oscillations. Further in accordance with the invention, movement of the pallet lever is used to frequency-modulate a carrier wave which is subsequently demodulated to obtain a frequency indication. In the present embodiment, the foregoing is accomplished by a very high frequency oscillation generator 35 mounted on a nonrotatable support such as the table 17 and coupled to a pickup or reactance element 36 disposed adjacent the path of the pallet lever on the carrier rotating with the rotating chuck and cooperating with the pallet lever to form a reactance whose value varies to modulate the output frequency of the generator in accordance with oscillations of the lever. The generator output is then demodulated and compared with a standard frequency to indicate whether the frequency of the lever oscillations is of a proper value.

The high frequency generator 35 is a tuned-plate tuned-grid oscillator of well known construction including a triode 37 having in its plate circuit a resonant coaxial transmission line 38 whose outer conductor is grounded and whose inner conductor is coupled at its inner end to the plate of the tube through a capacitor 40. Plate voltage for the tube is supplied by a suitable source 41 of direct current, the cathode of the tube being grounded and the grid being connected to ground through a tank circuit 42 and a grid bias circuit 43 including a resistor and a capacitor in parallel. The oscillator shown is designed to produce a center frequency of approximately 145 megacycles.

In the form of the invention shown in Figs. 2 and 4 the pickup element 36 is a conductor in the form of a loop 45 short-circuiting the outer ends of the inner and outer conductors of the coaxial line 38$^a$ and projecting outwardly beyond the end of the latter and downwardly toward a hole 46 (Fig. 3) which is formed in the fuze end wall 15 and across which one arm 12 of the pallet lever 10 oscillates. While the loop 45 may be positioned anywhere along the range of oscillation of the pallet lever arm, it is disposed along the median line of this range as shown in Fig. 5. With this arrangement, the reactance values are varied as the lever swings in either direction away from the loop 45 so that the carrier wave of the oscillator 35 is modulated by a frequency double that of the lever oscillations.

To permit the loop 45 to rotate with the fuze body 11 in a fixed position relative to the path of oscillation of the lever arm 12 and to enable the signals to be transferred away from the rotating parts without distortion, the transmission line includes a capacitor 47 having a rotating plate 48 and a nonrotating plate 49 arranged coaxially. The capacitor couples the outer end portion 38$^a$ of the transmission line, which is mounted in the chuck, with the remaining portion 38$^b$ which is connected to the generator. In this instance, the capacitor plates are parallel flat annular disks, one being mounted at the end of the rotating chuck while the other is stationarily mounted on a pedestal 51 fastened to an insulator plate 52 by a bolt 53. To provide axial adjustment, the capacitor plate 49 is secured within a ring 54 threaded into a supporting plate 50 mounted in a hood 55.

The capacitor plate 48 is supported on the chuck by means of an insulator plate 56 which is secured by screws 58 to the radially inwardly extending flange 59 formed on the upper end of the tubular supporting member 29. The coiled portion 38$^a$ of the transmission line is nested in a recess formed in the supporting member and underlying the capacitor plate 48.

The hood 55 is a hollow casting which forms a removable guard around the chuck. To expose the top of the latter and permit easy insertion of the fuze to be tested, the hood is fulcrumed at 60 and may be swung upwardly and laterally away from the chuck.

The capacitor 47 readily passes electric signals at the high frequencies of the generator but blocks signals at lower frequencies and thereby substantially eliminates distortion of the loop signals caused by stray low frequency currents on the rotating parts. To eliminate the effect of changing capacitance between the capacitor disks 48 and 49, the latter are located along the line 38 at a point of maximum voltage with respect to the standing waves of the line and therefore a point of maximum impedance. For this purpose, the length of the inner end portion 38$^b$ of the line is made equal to an even number of quarter lengths of waves at the center frequency of the generator and the outer end portion 38$^a$ of the line is a matching stub whose length is correlated with the impedance of the pickup element 36 to retain the resonant characteristics of the line.

When the pickup element 38 is a loop short-circuiting the inner and outer conductors of the coaxial line as described above, it cooperates with the pallet lever arm 12 to form a variable inductance so that the matching stub is made equal in length to an odd number of quarter wave lengths at the center frequency of the generator. In the present instance, the outer end portion 38$^a$ of the line is equal to one quarter-wave length which, at a frequency of 145 megacycles, is approximately 20.4 inches.

In the modified forms of the invention shown in Figs. 7 and 8, the pickup element 36 is in the form of a capacitance probe constructed to cooperate with the pallet lever arm 12 to form a capacitance whose value is varied in response to movement of the lever. As shown in Fig. 7, the capacitive probe is a conductor in the form of a loop 62 secured at both ends to the rotating capacitor disk 48. In order that the capacitor plate 49 may occupy the same position adjacent the path of the lever arm as that occupied by the above described inductive loop 45, the cuplike member 27 and inner tubular member 29 of the chuck are shortened axially with the loop 62 extending downwardly from the disk through a central aperture in the insulator plate 56. With the capacitive loop connected directly to the rotating capacitor disk, the length of the matching transformer or stub is zero and the probe is therefore at a point of maximum voltage.

In the modification of Fig. 8 the pickup element 36 is formed by an extension 61 of the center line of the outer line portion 38$^a$ which is open circuited. In this case, the length of the outer line portion 38$^a$ is made equal to an even number of quarter wave lengths to locate the capacitor at a maximum voltage point along the line.

When a fuze to be tested is clamped in the chuck and the hood 55 is placed into the closed operating position shown in Fig. 1, movement of the pallet lever arm 12 back and forth between the positions shown in full and in dotted lines in Fig. 5 results in a cyclic variation in the reactance at the termination of the transmission line 38 and a corresponding variation in the effective length of the latter. This effects changes in the tuning of the plate circuit of the triode 37 and modulation of the frequency of the latter in accordance with the lever oscillations. Then the generator frequency is demodulated to produce a signal at the frequency of the lever oscillations which may be measured and indicated by instrument means 64 well known in the art, for example, a Type 1176–A frequency meter manufactured by the General Radio Company and described in its Catalog M, dated October 1951.

Prior to demodulation, the generator output is stepped down in frequency by beating against a crystal controlled local oscillator 65 in a mixer 66. The frequency of the local oscillator differs from that of the generator 35 by approximately 10 megacycles per second. The signal next is amplified in an intermediate frequency amplifier and limiter 67. Demodulation occurs in a detector 68 whose output is coupled to the input of the frequency meter 64. The circuits of the parts 65—68 are well known in the art being found in any comprehensive radio handbook.

To test the timer of a fuze with the apparatus described above, the hood 55 is swung upwardly and out of the way and the screws 32 and bayonet connections 33 are released to permit removal of the cuplike member 27. The fuze body or carrier 11 is thereupon seated in the recess 22 and the cuplike member 27 is replaced to clamp the fuze in place in the chuck. The hood is then moved downwardly against a stop 66$^a$ (Fig. 1) to bring the reactance element 36 into the range of oscillation of the pallet lever 12 as shown in Figs. 2 and 4. With the fuze thus clamped securely in the chuck and the hood in place, the motor 19 (Fig. 1) is started, the lever beginning to oscillate automatically when the chuck attains a predetermined speed. Through the electrical circuit described above, the frequency of the lever oscillation is indicated on the meter 64.

It will be apparent that the apparatus described above makes possible the measurement of the frequency of the lever oscillations without objectionable variations of the electric signals incident to high speed rotation of the fuze body. By producing signals of a very high frequency in response to the lever oscillations, these signals may be transmitted away from the rotating parts by the coupling capacitor 47 which is effective to block the transmission of stray signals of low frequencies away from the rotating parts. The location of the capacitor 47 at a point of maximum voltage along the transmission line 38 by selecting the proper lengths for the end portions 38$^a$ and 38$^b$ of the line insures that changes in coupling capacitance and particularly cyclical changes caused by rotation of the chuck will not have any distorting effect on the signals being measured.

I claim as my invention:

1. Apparatus for measuring the frequency of oscillation of an oscillating part during rotation of a device carrying the part comprising a support adapted to mount said device for rotation at high speed, a high frequency oscillation generator having a resonant circuit including a length of resonant coaxial transmission line having one end connected in the circuit and having a pickup element at its other end, said pickup element being mounted on said support for rotation therewith and in a fixed position with respect to said device to cooperate with said part to form a reactance which varies in accordance with oscillations of the part, a coupling capacitor interposed in said transmission line and having one plate mounted on and rotatable with said support and having a stationary plate cooperating therewith, and means responsive to the output of said generator for indicating the frequency of oscillation of said part.

2. Apparatus for measuring the frequency of oscillation of an oscillating part mounted on a rotatable carrier comprising a support for securing and for rotating said carrier, a capacitor having a plate member mounted for rotation with said carrier and a second stationary plate member cooperating with said first member for transmitting high frequency signals away from said carrier, a radio frequency generator having a resonant circuit including a coaxial transmission line coupled to said stationary capacitor plate member, a second coaxial line having one end connected to said rotary capacitor plate member and its other end having a pickup element adjacent said oscillating part to cooperate with the latter to form a reactance whose value varies to change the output frequency of said generator in accordance with oscillations of said oscillating part, and means responsive to the output of said generator to indicate the frequency of oscillation of said part, said second coaxial line having a length correlated with said reactance and the frequency of said generator to locate said capacitor at a point of maximum voltage with respect to the standing waves along the line.

3. Apparatus for testing a device having a rotatable carrier body and an oscillatable part thereon which is movable back and forth relative to said body during rotation of the latter comprising means for supporting said body and for rotating it at high speed, means for creating an electric field of a predetermined high frequency in the vicinity of said oscillatable part and producing high frequency signals in response to oscillating movement of said part, and means coupled to said field means and operable in response to said signals to indicate the frequency of movement of said part back and forth, said high frequency field means including a pickup element mounted on said supporting means adjacent the path of movement of said part to cooperate with the latter to form a variable reactance, a coupling capacitor having a plate mounted on said supporting means to rotate with said body and having a fixed plate, and a coaxial line coupling said pickup element to said capacitor and having a length correlated with said reactance and the frequency of said field to locate said coupling capacitor at a point of maximum voltage with respect to the standing waves along the line.

4. Apparatus for measuring the frequency of an oscillating part during rotation of a device carrying such part comprising a support for carrying said device and for rotating it at high speed, a high frequency oscillation generator having a resonant circuit, a pickup element insulated from said support and mounted thereon for rotation with said device and in a fixed position relative to the latter to cooperate with said oscillating part and form a reactance therewith whose value varies in accordance with oscillations of said part relative to the device, a coupling capacitor having a rotatable member mounted on and insulated from said support and connected to said reactance element and a stationary member coupled to said resonant circuit and cooperating with the rotatable member to transmit variations in said reactance to said resonant circuit for modulating the frequency of said generator in accordance with oscillations of said oscillating part, and means responsive to the output of said generator for indicating the frequency of oscillation of said part.

5. Apparatus for measuring changes in a condition of a movable part disposed on a rotatable device during rotation thereof comprising a relatively stationary base, a support for carrying said device mounted on said base, means for rotating said device at high speed, means for creating a high frequency field in the vicinity of said movable part and producing high frequency signals in response to changes in the condition thereof, said means including a coupling capacitor adapted to transmit said high frequency signals to said support during rotation of the latter and including a capacitor disk mounted on and rotatable with the support and a relatively stationary capacitor plate mounted on the base, means for axially adjusting the stationary capacitor plate with respect to the rotatable capacitor disk, and means coupled to said high frequency field means and operable in response to said signals to indicate said condition of said part.

6. Apparatus for testing a device having a rotatable carrier and a part mounted thereon and movable back and forth relative thereto during rotation thereof comprising means for supporting and for rotating said carrier and said movable part thereon at high speed, means for creating a field of a predetermined high frequency in the vicinity of said movable part and producing high frequency signals in response to movement of said part, and means coupled to said field means and operable in response to said signals to indicate the frequency of movement of said part back and forth, said high frequency field means including a capacitor having a member mounted on said supporting means for rotation with said carrier and a coaxial line having a length equal to an odd number of quarter lengths of the waves of said predetermined frequency and having one end connected to said capacitor member and its other end short-circuited by a conductor having a loop positioned adjacent the path of said part to cooperate with the latter to form a variable inductance.

7. Apparatus for testing a timer having a rotatable carrier and a part thereon oscillatable back and forth during rotation of the carrier comprising means for supporting and for rotating said carrier, a high frequency oscillation generator having a resonant circuit, a length of coaxial line mounted on said supporting means and having one end coupled to said resonant circuit and its other end terminating adjacent the path of movement of said movable part, a conductor short circuiting said other line end to form an inductive probe in the form of a loop cooperating with said movable part to form an inductance whose value varies to modulate the output frequency of said oscillator in accordance with movements of said part, and means responsive to the output of said oscillator for indicating the frequency of movements of said movable part.

8. Apparatus for testing a device having a rotatable carrier and a part carried thereby and movable back and forth relative thereto during rotation thereof comprising means for supporting and for rotating said carrier at high speed, means for creating an electric field of a predetermined high frequency in the vicinity of said movable part and producing high frequency signals in response to movement of such part, and means coupled to said field means and operable in response to said signals to indicate the frequency of movement of said part back and forth, said high frequency field means including a capacitor having a member mounted on said supporting means for rotation with said body, and a probe of conducting material connected to said member and projecting therefrom to a position adjacent the path of said part to cooperate with the latter to form a variable capacitance.

9. Apparatus for testing a device having a rotatable carrier and a part thereon which is movable back and forth relative thereto during rotation thereof comprising means for supporting and for rotating said carrier with said movable part at high speed, means for creating an electric field of a predetermined high frequency in the vicinity of said movable part and producing high frequency signals in response to movement thereof, and means coupled to said field means and operable in response to said signals to indicate the frequency of movement of said part back and forth, said high frequency field means including a coupling capacitor having a plate member mounted on said supporting means for rotation with said carrier and a coaxial line having a length equal to an even number of quarter lengths of the waves of said predetermined frequency of said field and having one end connected to said capacitor member and its other end open circuited with the center conductor positioned adjacent the path of said part to cooperate with the latter to form a variable capacitive reactance.

10. Apparatus for measuring the frequency of oscillation of an oscillatable part mounted on a rotating carrier comprising a support for mounting and for rotating said carrier, a capacitor having one plate member mounted for rotation with said carrier and a second relatively stationary plate member cooperating with said first member for transmitting high frequency signals away from said carrier, a radio frequency generator having a resonant circuit including a coaxial transmission line coupled to said stationary capacitor plate member, a second coaxial line having one end connected to said rotary capacitor plate member and its other end terminating adjacent said oscillatable part to cooperate with the latter to form a reactance whose value varies to change the output frequency of said generator in accordance with oscillations of said part, and means responsive to the output of said generator to indicate the frequency of oscillation of the part.

11. Apparatus for measuring the frequency of oscillation of an oscillatable part mounted on a rotatable carrier comprising means for supporting and for rotating said carrier, a radio frequency generator having a resonant circuit, a length of coaxial line mounted for rotation with said carrier and having one end coupled to said resonant circuit and its other end terminating adjacent the path of oscillation of said oscillatable part and open circuited with the center conductor cooperating with such part to form a capacitive reactance whose value varies to change the tuning of said circuit and the output frequency of said generator in accordance with oscillations of the part, and means responsive to the output of said generator to indicate the frequency of oscillation of said part.

12. Apparatus for measuring the frequency of oscillation of an oscillating part mounted on a rotating carrier formed with a recess and comprising means for supporting and for rotating said carrier, a radio frequency oscillator having a resonant circuit including a coaxial transmission line including a capacitor comprising a stationary plate and a rotatable plate, a coiled length of the coaxial transmission line mounted within the recess and beneath said rotatable plate on said supporting means for rotation therewith and having one end coupled to said resonant circuit and its other end terminating adjacent the path of oscillation of said oscillating part and cooperating with the latter to form a reactance whose value varies to change the tuning of said circuit and the output frequency of said oscillator in accordance with oscillations of said part, and means responsive to the output of said oscillator for indicating the frequency of oscillation of said part.

13. Apparatus for measuring the frequency of an oscillating part during rotation of a device carrying such part comprising a support for carrying and for rotating said device at high speed, a high frequency oscillation generator having a resonant circuit including a coaxial transmission line including a capacitor comprising a stationary plate and a rotatable plate, a probing element mounted on said support for rotation with said device and in a fixed position relative to the latter to cooperate with said oscillating part to form a variable reactance whose value changes cyclically during each oscillation of said part, said probing element operatively disposed substantially along the median range of oscillation of the oscillating part, means coupling said probing element to said resonant circuit to cause modulation of the output frequency of said generator in accordance with changes in said reactance produced by oscillations of said part, and means responsive to the output of said generator for indicating the frequency of oscillation of said part.

References Cited in the file of this patent

UNITED STATES PATENTS

| | | |
|---|---|---|
| 2,343,452 | Gibbs | Mar. 7, 1944 |
| 2,361,634 | Koch | Oct. 31, 1944 |
| 2,455,345 | Watt | Nov. 30, 1948 |
| 2,476,761 | Olinger | July 19, 1949 |